US010309468B2

(12) United States Patent
Cooley

(10) Patent No.: US 10,309,468 B2
(45) Date of Patent: Jun. 4, 2019

(54) TORQUE PLATE BARREL HAVING BLENDED BARREL SUPPORT PEDESTAL

(71) Applicant: GOODRICH CORPORATION, Charlotte, NC (US)

(72) Inventor: Phillip E. Cooley, Kettering, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 15/789,223

(22) Filed: Oct. 20, 2017

(65) Prior Publication Data
US 2019/0120302 A1    Apr. 25, 2019

(51) Int. Cl.
| F16D 65/00 | (2006.01) |
| F16D 65/12 | (2006.01) |
| F16D 55/36 | (2006.01) |
| F16D 65/02 | (2006.01) |

(52) U.S. Cl.
CPC ......... F16D 65/0006 (2013.01); F16D 55/36 (2013.01); F16D 65/12 (2013.01); F16D 2065/1376 (2013.01)

(58) Field of Classification Search
CPC .......... F16D 55/24; F16D 55/36; F16D 55/38; F16D 55/40; F16D 55/42; F16D 65/0056; F16D 65/12; F16D 2065/1376; F16D 2065/1384; F16D 2065/1388
USPC ....................................................... 188/71.5
See application file for complete search history.

(56) References Cited

U.S. PATENT DOCUMENTS

| 3,977,631 | A | * | 8/1976 | Jenny | .................... B64C 25/405 244/50 |
| 6,119,817 | A | * | 9/2000 | Niespodziany | ......... F16D 55/36 188/18 A |
| 6,296,084 | B1 | * | 10/2001 | Trustee | ................... F16D 55/36 188/71.5 |
| 6,631,793 | B2 | * | 10/2003 | Evrard | .................. F16D 65/095 188/71.1 |
| 6,702,068 | B1 | * | 3/2004 | Riebe | ...................... F16D 55/36 188/251 A |
| 6,752,248 | B2 | | 6/2004 | Berwanger | |
| 7,168,528 | B1 | * | 1/2007 | Bok | ........................ F16D 55/36 188/71.7 |
| 7,900,751 | B2 | * | 3/2011 | Walker | ................ F16D 65/0043 188/71.5 |

(Continued)

FOREIGN PATENT DOCUMENTS

EP    0245191 A1 * 11/1987 ............. F16D 55/36

*Primary Examiner* — Thomas J Williams
(74) *Attorney, Agent, or Firm* — Snell & Wilmer, L.L.P.

(57) ABSTRACT

A torque plate barrel for a braking system includes a torque tube having a first end and a second end spaced from the first end along a central axis. The torque tube has an inner surface and a pedestal. The pedestal has a foot portion disposed and sized for engagement with an axle and a head portion disposed and sized for engagement with the inner surface of the torque tube. The head portion of the pedestal includes a first radius of curvature defining a first surface facing toward the first end of the torque tube and a second radius of curvature defining a second surface facing toward the second end of the torque tube. The pedestal may include different cross sectional geometries extending circumferentially over different angular segments about the inner surface of the torque tube barrel.

18 Claims, 6 Drawing Sheets

(56) References Cited

U.S. PATENT DOCUMENTS 8,616,344 B2 12/2013 Baden
8,950,557 B2 2/2015 Houser

* cited by examiner

TORQUE PLATE BARREL HAVING BLENDED BARREL SUPPORT PEDESTAL

FIELD

The present disclosure relates to torque plate barrels and, more particularly, to vibration mitigation torque plate barrels used in aircraft brake systems.

BACKGROUND

Aircraft typically utilize brake systems on wheels to slow or stop the aircraft during landings, taxiing and rejected takeoffs. The brake systems generally employ a brake stack comprising a series of friction disks that may be forced into sliding contact with one another during brake actuation to slow or stop the aircraft. Under various conditions, brake actuation may yield friction-induced vibration at wear surfaces of the friction disks, causing out-of-plane motion of the brake system, sometimes referred to as "whirl." Friction-induced vibration or whirl is capable of damaging the brake systems and landing gear.

SUMMARY

A torque plate barrel for a braking system is disclosed. In various embodiments, the torque plate barrel includes a torque tube having a first end and a second end spaced from the first end along a central axis. The torque tube has an inner surface and pedestal connected thereto. The pedestal includes a foot portion disposed and sized for engagement with an axle and a head portion disposed and sized for engagement with the inner surface of the torque tube. The head portion of the pedestal includes a first radius of curvature defining a first surface facing toward the first end of the torque tube and a second radius of curvature defining a second surface facing toward the second end of the torque tube. The first radius of curvature is at least about two times greater than the second radius of curvature.

In various embodiments, the first radius of curvature is at least about five times greater than the second radius of curvature. In various embodiments, the pedestal further includes a web portion extending radially between the head portion and the foot portion. The web portion may include a first radial surface facing toward the first end and a second radial surface facing toward the second end. The first surface defined by the first radius of curvature may have a radially outer portion that intersects the inner surface of the torque tube and a radially inner portion that intersects a portion of the first radial surface. In various embodiments, the foot portion of the pedestal includes a third radius of curvature defining a third surface facing toward the second end of the torque tube. The third radius of curvature may have a value about equal to the second radius of curvature.

In various embodiments, the foot portion may include a circumferential surface configured to engage an outer surface of the axle and a radial plane extending through an axial midpoint of the circumferential surface that defines a first portion of the pedestal facing toward the first end of the torque tube and a second portion of the pedestal facing toward the second end of the torque tube. A first cross sectional area is defined by the first portion of the pedestal, which is greater in value than a second cross sectional area defined by the second portion of the pedestal. In various embodiments, the first cross sectional area encompasses the area of the pedestal on the side of the radial plane facing the first end of the torque tube to a first point where the first radius of curvature intersects with the inner surface of the torque tube and the second cross sectional area encompasses the area of the pedestal on the side of the radial plane facing the second end of the torque tube to a second point where the second radius of curvature intersects with the inner surface of the torque tube. In various embodiments, the first cross sectional area is at least about twice as great as the second cross sectional area.

In various embodiments, the pedestal includes a first pedestal portion having a first pedestal cross section extending circumferentially about the central axis a first angular segment and a second pedestal portion having a second pedestal cross section extending circumferentially about the central axis a second angular segment, and the first pedestal cross section has a shape different from the second pedestal cross section. In various embodiments, the pedestal further includes a third pedestal portion having a third pedestal cross section extending circumferentially about the central axis a third angular segment, and the third pedestal cross section has a shape different from the first pedestal cross section and the second pedestal cross section. In various embodiments, the pedestal includes one or more apertures extending therethrough.

In various embodiments, a torque plate barrel for a braking system includes a torque tube and a pedestal mounted therein. The torque tube has a first end and a second end spaced from the first end along a central axis and an inner surface. The pedestal may be disposed intermediate the first end and the second end of the torque tube. The pedestal has a first circumferential surface, having an axial midpoint, configured to engage an outer surface of an axle and a second circumferential surface configured to engage the inner surface of the torque tube. The pedestal further includes a first surface facing toward the first end of the torque tube and a second surface facing toward the second end of the torque tube. A radial plane extending through the axial midpoint of the first circumferential surface defines a first cross sectional area encompassing the area of the pedestal on the side of the radial plane facing the first end of the torque tube to a first point where the first surface intersects the inner surface of the torque tube and a second cross sectional area encompassing the area of the pedestal on the side of the radial plane facing the second end of the torque tube to a second point where the second surface intersects the inner surface of the torque tube. In various embodiments, the first cross sectional area is greater than the second cross sectional area. In various embodiments, the first cross sectional area is at least about twice as great as the second cross sectional area.

In various embodiments, the pedestal includes a first pedestal portion having a first pedestal cross section extending circumferentially about the central axis a first angular segment and a second pedestal portion having a second pedestal cross section extending circumferentially about the central axis a second angular segment, and the first pedestal cross section has a shape different from the second pedestal cross section. In various embodiments, the pedestal includes one or more apertures extending therethrough, which may be spaced evenly or unevenly about the pedestal.

In various embodiments, a torque plate barrel for a braking system includes a torque tube and a pedestal. The torque tube may have a first end and a second end spaced from the first end along a central axis and an inner surface. The pedestal may include a foot portion having a circumferential surface configured for engagement with an axle, the circumferential surface having an axial midpoint, a head portion connected to the inner surface of the torque tube and a web portion radially disposed between the head portion and the foot portion. The head portion may include a first radius of curvature defining a first surface facing toward the first end of the torque tube and a second radius of curvature defining a second surface facing toward the second end of the torque tube. In various embodiments, the first radius of curvature is at least about two times greater than the second radius of curvature.

In various embodiments, a radial plane extending through the axial midpoint of the circumferential surface defines a first cross sectional area encompassing the area of the pedestal on the side of the radial plane facing the first end of the torque tube to a first point where the first surface intersects the inner surface of the torque tube and a second cross sectional area encompassing the area of the pedestal on the side of the radial plane facing the second end of the torque tube to a second point where the second surface intersects the inner surface of the torque tube. In various embodiments, the first cross sectional area is greater than the second cross sectional area. In various embodiments, the pedestal includes a first pedestal portion having a first pedestal cross section extending circumferentially about the central axis a first angular segment and a second pedestal portion having a second pedestal cross section extending circumferentially about the central axis a second angular segment, where the first pedestal cross section has a shape different from the second pedestal cross section.

BRIEF DESCRIPTION OF THE DRAWINGS

The accompanying drawings illustrate various embodiments employing the principles described herein and are a part of the specification. The illustrated embodiments are meant for description and not to limit the scope of the claims.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

As used herein, a first component that is "radially outward" of a second component means that the first component is positioned at a greater distance away from a common axis than the second component. A first component that is "radially inward" of a second component means that the first component is positioned closer to the common axis than the second component. In the case of components that rotate circumferentially about a common axis, a first component that is radially inward of a second component rotates through a circumferentially shorter path than the second component. As used herein, "distal" refers to the direction outward, or generally, away from a reference component. As used herein, "proximal" and/or "proximate" refer to a direction inward, or generally, towards the reference component. All ranges may include the upper and lower values, and all ranges and ratio limits disclosed herein may be combined. Unless specifically stated otherwise, reference to "a," "an" or "the" may include one or more than one and reference to an item in the singular may also include the item in the plural.

Figure 1A:
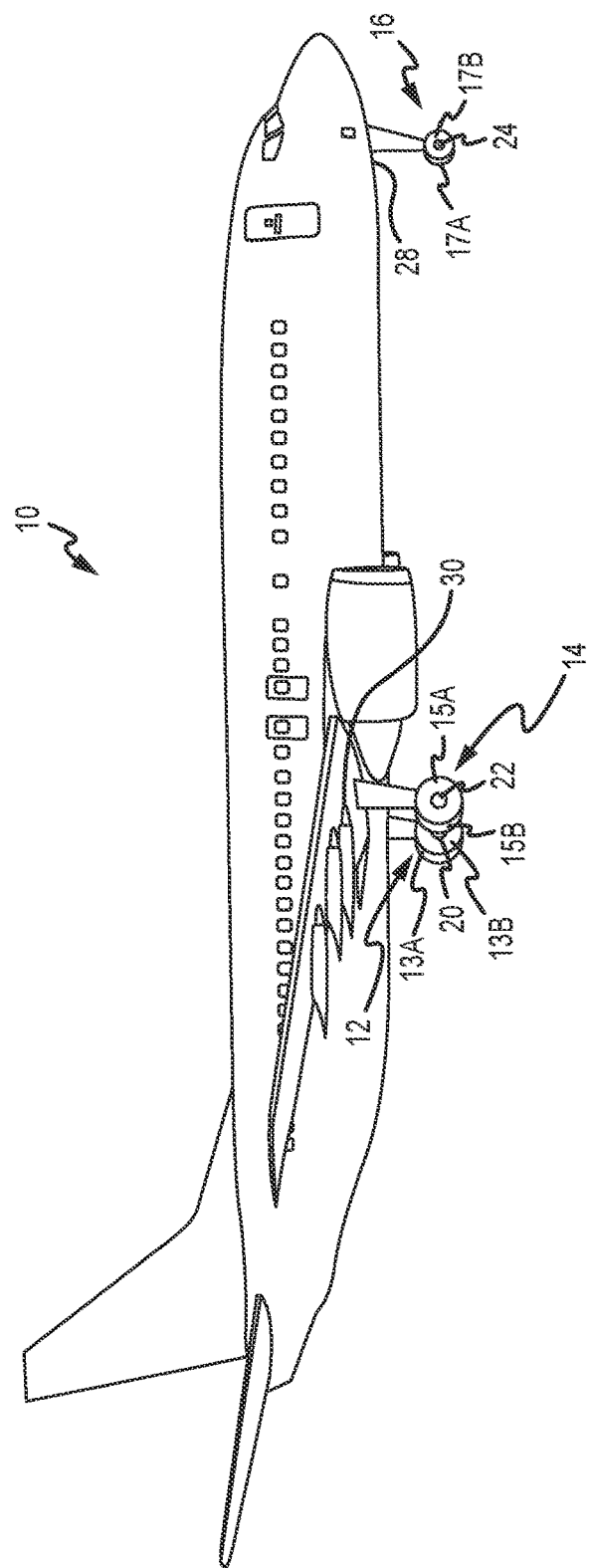
FIG. 1A illustrates an exemplary aircraft having a brake system, in accordance with various embodiments.

Referring to FIG. 1A, in accordance with various embodiments, an aircraft 10 is illustrated. The aircraft 10 includes landing gear, which may include a left main landing gear 12, a right main landing gear 14 and a nose landing gear 16. The left main landing gear 12, the right main landing gear 14, and the nose landing gear 16 may generally support the aircraft 10 when it is not flying, allowing the aircraft 10 to taxi, take off and land without damage. The left main landing gear 12 may include a left wheel 13A and a right wheel 13B coupled by a left main axle 20. The right main landing gear 14 may include a left wheel 15A and a right wheel 15B coupled by a right main axle 22. The nose landing gear 16 may include a left nose wheel 17A and a right nose wheel 17B coupled by a nose axle 24. In various embodiments, the aircraft 10 may comprise any number of landing gear and each landing gear may comprise any number of wheels. The left main landing gear 12, the right main landing gear 14, and the nose landing gear 16 may each be retracted for flight. Each landing gear may extend from an underside of the fuselage 28 or from an underside of the wings 30.

Figure 1B:
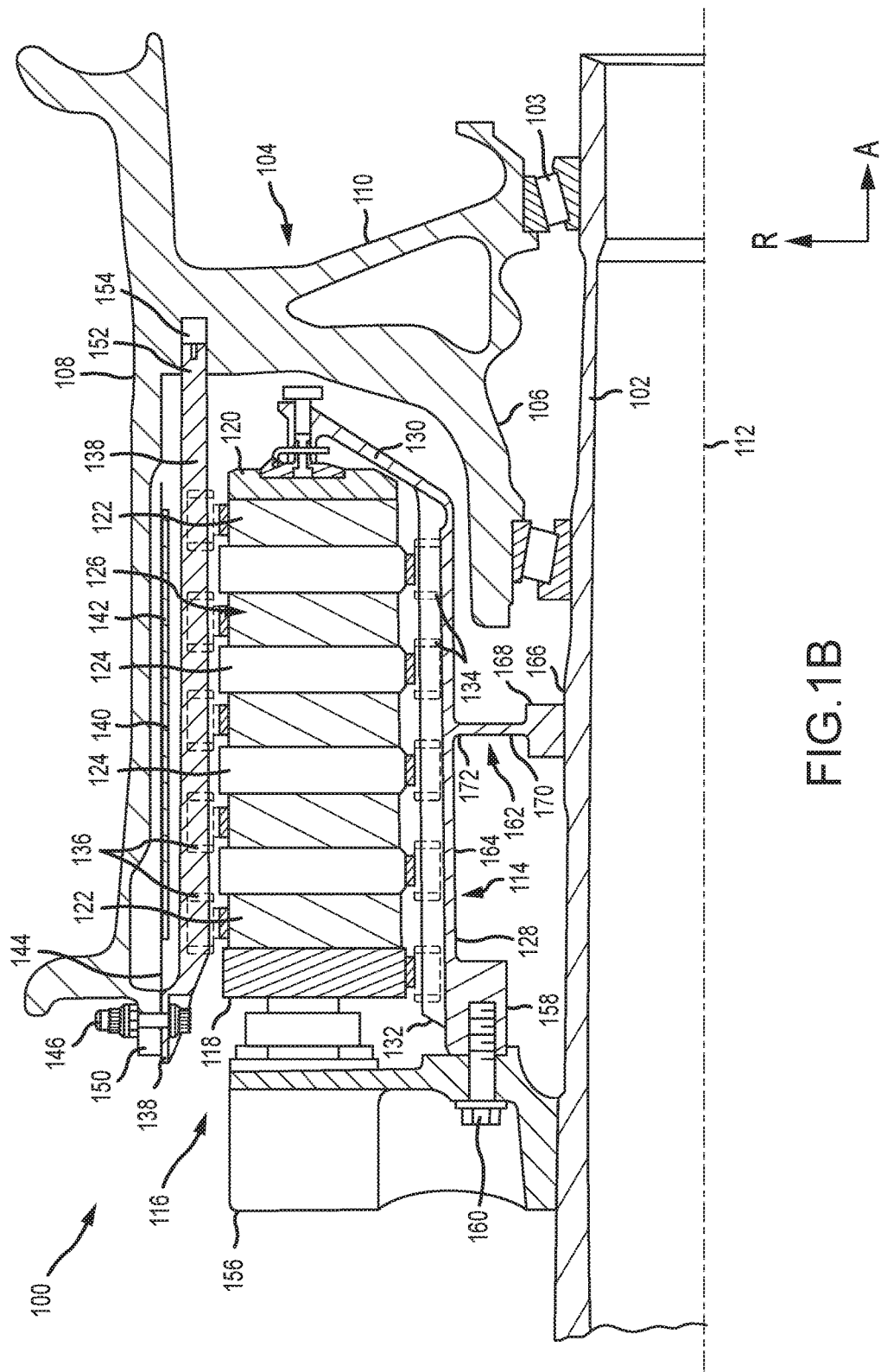
FIG. 1B illustrates a cross-sectional view of a brake assembly, in accordance with various embodiments.

Referring now to FIG. 1B, there is schematically depicted a brake mechanism 100 mounted on an axle 102 for use with a wheel 104 disposed on and configured to rotate about the axle 102 via one or more bearing assemblies 103. The wheel 104 includes a hub 106, a wheel well 108 concentric about the hub 106 and a web 110 interconnecting the hub 106 and the wheel well 108. An axial centerline 112 extends through the axle 102 and defines a center of rotation of the wheel 104. A torque plate barrel 114 (sometimes referred to collectively as a torque tube or barrel and a torque plate or back leg) is aligned concentrically with the hub 106, and the wheel 104 is rotatable relative to the torque plate barrel 114.

The brake mechanism 100 includes a piston assembly 116, a pressure plate 118 disposed adjacent the piston assembly 116, an end plate 120 positioned a distal location from the piston assembly 116, and a plurality of interleaved rotor disks 122 and stator disks 124 positioned intermediate the pressure plate 118 and the end plate 120. The pressure plate 118, interleaved rotor disks 122 and stator disks 124 and the end plate 120 together form a brake heat sink or brake stack 126. The pressure plate 118, the end plate 120 and the stator disks 124 are mounted to the torque plate barrel 114 and prevented from rotating relative to the axle 102.

The torque plate barrel 114 may include an annular barrel or torque tube 128 and an annular plate or back leg 130. The back leg 130 is disposed at an end distal from the piston assembly 116 and may be made integral with the torque tube 128, as illustrated in FIG. 1B, or may be made as a separate annular piece and suitably connected to the torque tube 128. The torque tube 128 has a plurality of circumferentially spaced and axially extending splines 132 disposed on an outer surface of the torque tube 128. The stator disks 124 and pressure plate 118 include notches or stator slots 134 on an inner periphery of the disks and the plate for engagement with the splines 132, such that each disk and the plate are axially slidable with respect to the torque tube 128.

The end plate 120 is suitably connected to the back leg 130 of the torque plate barrel 114 and is held non-rotatable, together with the stator disks 124 and the pressure plate 118 during a braking action. The rotor disks 122, interleaved between the pressure plate 118, the end plate 120 and the stator disks 124, each have a plurality of circumferentially spaced notches or rotor lugs 136 along an outer periphery of each disk for engagement with corresponding torque bars 138 that are secured to or made integral with an inner periphery of the wheel 104.

The stator disks 124 and rotor disks 122 each have friction surfaces or linings secured to opposite faces thereof. Both the pressure plate 118 and the end plate 120 likewise have friction surfaces or linings. The friction surfaces or linings of each of the above mentioned components are configured for sliding, frictional engagement with the friction linings of adjacent components during a braking action. The pressure plate 118, the end plate 120 and the stator disks 124 and rotor disks 122 can be formed of carbon or ceramic composite materials. The respective annular friction surfaces or linings may also be formed of carbon or ceramic composite materials and attached by, for example, rivets or adhesives to the respective surfaces. The friction surfaces or linings and the disks they are a part of may also be an integral assembly such as with carbon composite brakes. The frictional surfaces on both the stator disks 124 and the rotor disks 122 provide a heat sink during a braking action, converting the kinetic energy of the moving aircraft 10 into thermal energy or heat. The number and size of the disks may be varied as is necessary for the application involved.

A heat shield 140 is secured directly or indirectly to the wheel 104 between a radially inward surface of the wheel well 108 and the torque bars 138. As illustrated in FIG. 1B, the heat shield 140 is concentric with the wheel well 108 and may have a plurality of heat shield sections 142 disposed between respective, adjacent pairs of torque bars 138. The heat shield 140, or heat shield sections 142, is spaced from the radially inward surface of the wheel well 108 and secured in place by heat shield carriers 144, such that the heat shield 140, or heat shield sections 142, is disposed generally parallel to the axis of rotation or axial centerline 112 of the wheel 104 and intermediate the torque bars 138 and the radially inward surface of the wheel well 108.

The torque bars 138 and heat shield carriers 144 are attached at their axially inboard end to the wheel 104 by torque bar bolts 146. The torque bar bolts 146 extend through respective holes in a flange 150 provided on the wheel 104 as shown, which flange 150 for purposes of the present description is intended to be considered as part of the wheel well 108. Each torque bar 138 has a pin 152 at its axially outboard end (i.e., the end opposite the torque bar bolts 146) that is received within a hole 154 disposed proximate the web 110 of the wheel 104. After axial insertion between respective pairs of carriers 144, the heat shield 140, or heat shield sections 142, may be secured adjacent a radially inward surface of the wheel well 108.

An actuating mechanism for the brake mechanism 100 includes a plurality of piston assemblies 116 circumferentially spaced around an annular piston housing 156 (only one piston assembly 116 is illustrated in FIG. 1B). Upon actuation, the piston assemblies 116 effect a braking action by urging the pressure plate 118 and the stator disks 124 into frictional engagement with the rotor disks 122 and against the end plate 120. Fluid or hydraulic pressure or mechanical springs, among other mechanisms, may be used to actuate the piston assemblies 116. Through compression of the interleaved rotor disks 122 and stator disks 124 between the pressure plate 118 and the end plate 120, the resulting frictional contact slows or stops or otherwise prevents rotation of the wheel 104. The rotor disks 122 and the stator disks 124 are fabricated from various materials, such as ceramic matrix composites, that enable the brake disks to withstand and dissipate the heat generated during and following a braking action.

The torque plate barrel 114 is secured to a stationary portion of the landing gear such as the axle 102, preventing the torque plate barrel 114 and the stator disks 124 from rotating during braking of the aircraft. The torque tube 128 portion of the torque plate barrel 114 may be attached to the annular piston housing 156 via an annular mounting surface 158, wherein bolt fasteners 160 (or, alternatively, welds or rivets) secure the torque plate barrel 114 to the annular piston housing 156. A spacer member or pedestal 162 is positioned between an inner diameter surface 164 of the torque tube 128 and an outer diameter surface 166 of the axle 102. The pedestal 162 includes a radially inner surface or foot 168 for engaging the axle 102, a web portion 170 radially outward of the foot 168 and a head portion 172 for engaging the inner diameter surface 164 of the torque tube 128. The pedestal 162 augments support of the torque plate barrel 114 within the brake mechanism 100 generally and, more particularly, against the stationary axle 102. The pedestal 162 may be made integral with the torque tube 128 portion of the torque plate barrel 114.

Figure 2:
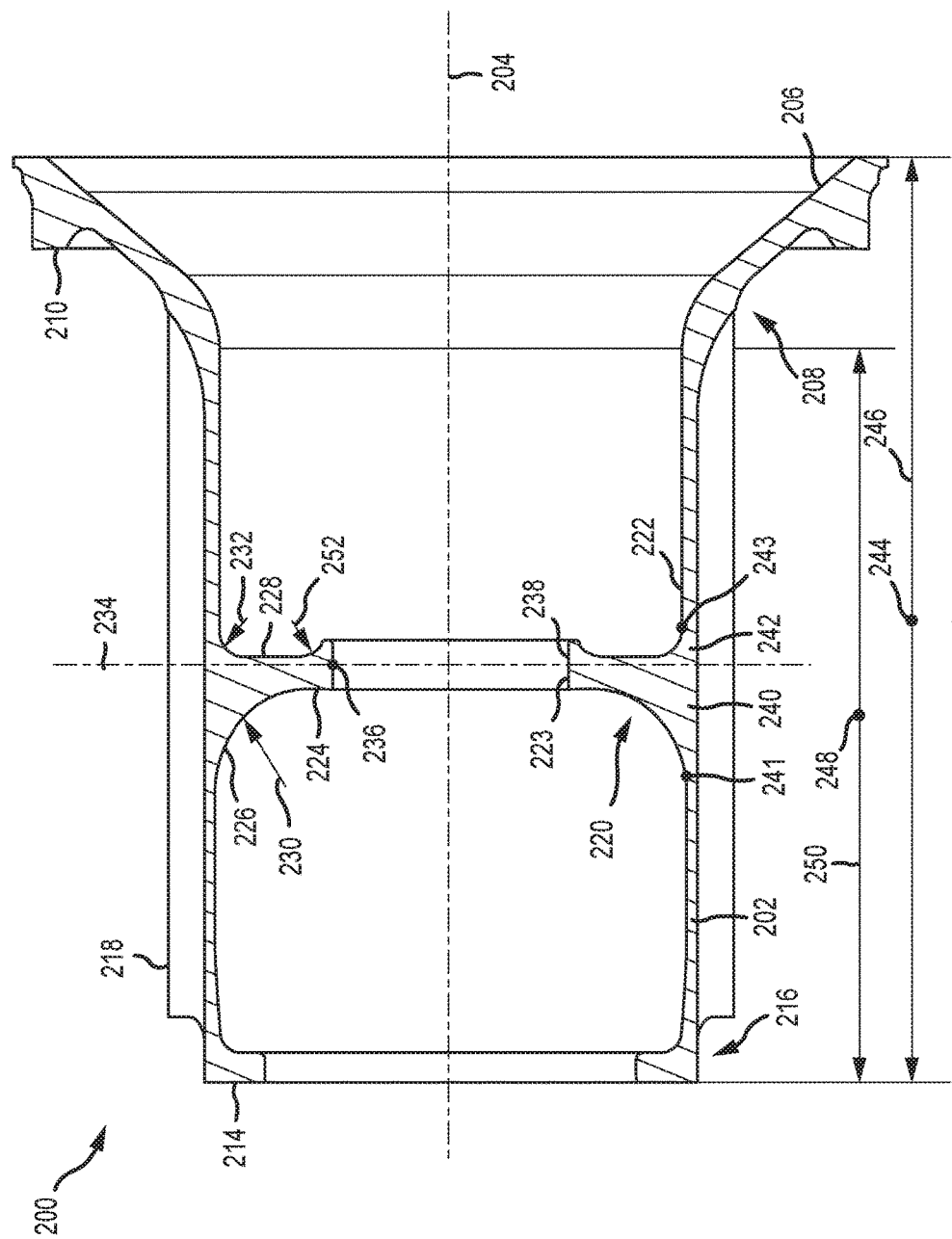
FIG. 2 illustrates a torque plate barrel of a brake assembly, in accordance with various embodiments.

Referring now to FIG. 2, a torque plate barrel 200 is illustrated in greater detail according to various embodiments. The torque plate barrel 200 includes a generally cylindrical torque tube 202 positioned about a central axis 204, which coincides with the axial centerline 112 of the brake mechanism 100 when positioned about the axle 102 as described above with reference to FIG. 1B. A radially outwardly flared reaction member or annular plate or back leg 206 is positioned proximate an axially outboard end 208 of the torque tube 202. A first flange 210 having a plurality of apertures is positioned on the back leg 206 for axially and non-rotatably mounting an end plate of a brake stack to the torque plate barrel 200, such as the end plate 120 described above with reference to FIG. 1B. A second flange 214 having a plurality of apertures is positioned at an axially inboard end 216 opposite the back leg 206 for receiving fasteners to secure the torque plate barrel 200 to a brake mechanism, such as the brake mechanism 100 described above. The second flange 214 functions not only to secure the torque plate barrel 200 to a brake mechanism, but to transfer torque from a brake stack to the torque plate barrel 200 during a braking event. The torque plate barrel 200 further includes a plurality of splines 218 for slidably keying in the axial direction a plurality of stator disks and to limit rotation thereof, such as the stator disks 124 described above with reference to FIG. 1B.

The torque plate barrel 200 includes a spacer member or pedestal 220 positioned between an inner diameter surface 222 of the torque tube 202 and an outer diameter surface of an axle 223, such as the axle 102 illustrated in FIG. 1B. The pedestal 220 includes a radially inner portion or foot 224 for engaging the axle, a radially outer portion or head 226 for engaging the inner diameter surface 222 of the torque tube 202 and a web portion 228 radially outward of the foot 224 and radially inward of the head 226. In various embodiments, the web portion 228 includes a substantially radial plane that is substantially perpendicular to the central axis 204 on the outboard side of the pedestal (i.e., the side facing the back leg 206). In various embodiments, the web portion 228 includes a substantially radial plane that is substantially perpendicular to the central axis 204 on the inboard side of the pedestal (i.e., the side facing away from the back leg 206). The pedestal 220 augments support of the torque plate barrel 200 within a brake mechanism generally and, more particularly, against a stationary axle, such as the brake mechanism 100 and axle 102 illustrated in FIG. 1B. The pedestal 220 may be made integral with the torque tube 202 portion of the torque plate barrel 200.

Still referring to FIG. 2, the pedestal 220, or, more particularly, the radially outward portion or head 226 portion of the pedestal 220, may include a first radius of curvature 230 and a second radius of curvature 232. A surface defined by the first radius of curvature 230 faces generally in an axially inboard direction or in a direction away from the back leg 206, while a surface defined by the second radius of curvature faces generally in an axially outboard direction or in a direction toward the back leg 206. In various embodiments, the first radius of curvature 230 is large relative to the second radius of curvature 232. In various embodiments, the surface defined by the first radius of curvature 230 includes the radially inboard surface of the web portion 228. In various embodiments, the first radius of curvature 230 may have a value of about 1.0 inches (25.4 mm) to about 2.0 inches (50.8 mm), while the second radius of curvature 232 may have a value approaching zero. In various embodiments, a ratio between respective values of the first radius of curvature 230 and the second radius of curvature 232 is at least about 2:1. In various embodiments, a ratio between respective values of the first radius of curvature 230 and the second radius of curvature 232 is at least about 10:1.

The pedestal 220 may be further defined by a radial plane 234 disposed perpendicular to the central axis 204. The radial plane 234 is positioned axially along the central axis 204 to coincide with an axial midpoint 236 of a radially inner surface 238 of the foot 224 configured to engage the axle. The radial plane 234 cuts the pedestal 220 into a first portion 240, defined by and encompassing the area of the pedestal 220 left of the radial plane 234 (that is, on the side of the radial plane facing away from the back leg 206) to a point 241 where the first radius of curvature 230 substantially intersects with the inner surface 222 of the torque tube 202 and a second portion 242, defined by and encompassing the area of the pedestal 220 right of the radial plane 234 (that is, on the side of the radial plane facing toward the back leg 206) to a point 243 where the second radius of curvature 232 substantially intersects with the inner surface 222 of the torque tube 202. In various embodiments, the cross sectional area of the first portion 240 defined as above is greater than the cross sectional area of the second portion 242. In various embodiments, a ratio between respective values of the cross sectional areas defined by the first portion 240 and the second portion 242 is at least about 2:1. In various embodiments, the ratio between respective values of the cross sectional areas defined by the first portion 240 and the second portion 242 is at least about 5:1.

In various embodiments, the radial plane 234 is positioned at a midpoint 244 along an axial length 246 of the torque plate barrel 200. In various embodiments, the radial plane 234 is positioned at a midpoint 248 along an axial length 250 of the torque tube 202 portion of the torque plate barrel 200. In various embodiments, a surface defined by the first radius of curvature extends from proximate the point 241 where the first radius of curvature 230 substantially intersects the inner surface 222 of the torque tube 202 to proximate a second point where the first radius of curvature 230 substantially intersects a portion of the web portion 228. In various embodiments, a surface defined by the first radius of curvature extends from proximate the point 241 where the first radius of curvature 230 substantially intersects the inner surface 222 of the torque tube 202 to proximate a second point where the first radius of curvature 230 substantially intersects a portion of the foot 224.

In various embodiments, the pedestal 220 includes a radial length defined as the length in the radial direction from the radially inner surface 238 of the foot 224 to the inner surface 222 of the torque tube 202. In various embodiments, the second point where the first radius of curvature 230 substantially intersects a portion of the web portion 228 is located about one-half the radial length from the inner surface 222 to the radially inner surface 238 of the foot 224. In various embodiments, the second point where the first radius of curvature 230 substantially intersects a portion of the web portion 228 is located about three-quarters the radial length from the inner surface 222 to the radially inner surface 238 of the foot 224. In various embodiments, the second point where the first radius of curvature 230 substantially intersects a portion of the web portion 228 is located proximate the radially inner surface 238 of the foot 224.

The pedestal 220, and, in particular, the radially inward portion or foot 224 of the pedestal 220, may be defined by a third radius of curvature 252. A surface defined by the third radius of curvature 252 faces generally in a direction toward the back leg 206 and is positioned radially inward of the surface defined by the second radius of curvature 232. In various embodiments, a value for the third radius of curvature 252 is small relative to a value for the first radius of curvature 230. In various embodiments, the third radius of curvature 252 may have a value approaching zero, while the first radius of curvature 230 may have a value of about 1.0 inches (25.4 mm) to about 2.0 inches (50.8 mm). In various embodiments, a ratio between respective values of the first radius of curvature 230 and the third radius of curvature 252 is at least about 10:1. In various embodiments, the second radius of curvature 232 and the third radius of curvature 252 have values that are about equal. In various embodiments, the second radius of curvature 232 and the third radius of curvature 252 have values that are within plus or minus ten percent (±10%) of one another.

In various embodiments, the inner diameter surface 222 of the torque tube 202 portion of the torque plate barrel 200 is positioned at a radius from the central axis 204 having a value from about 4 inches (101.6 mm) to about 6 inches (152.4 mm). In various embodiments, the inner diameter surface 222 of the torque tube 202 is positioned at a radius from the central axis 204 having a value of about 5.15 inches (130.8 mm) and the first radius of curvature has a value of about 1.6 inches (40.6 mm). In various embodiments, the value of the radius of the inner diameter surface 222 measured from the central axis 204 on the left side of the radial plane 234 is equal to the value of the radius of the inner diameter surface 222 measured from the central axis 204 on the right side of the radial plane 234. In various embodiments, the value of a radius of the inner diameter surface 222 measured from the central axis 204 on the left side of the radial plane 234 to a point 241 where the first radius of curvature 230 substantially intersects with the inner surface 222 of the torque tube 202 is equal to a value of the radius of the inner diameter surface 222 measured from the central axis 204 on the right side of the radial plane 234 to a point 243 where the second radius of curvature 232 substantially intersects with the inner surface 222 of the torque tube 202. In various embodiments, the value of the radius of the inner diameter surface 222 measured from the central axis 204 on the left side of the radial plane 234 is within plus or minus ten percent (±10%) of the value of the radius of the inner diameter surface 222 measured from the central axis 204 on the right side of the radial plane 234.

Figure 3A:
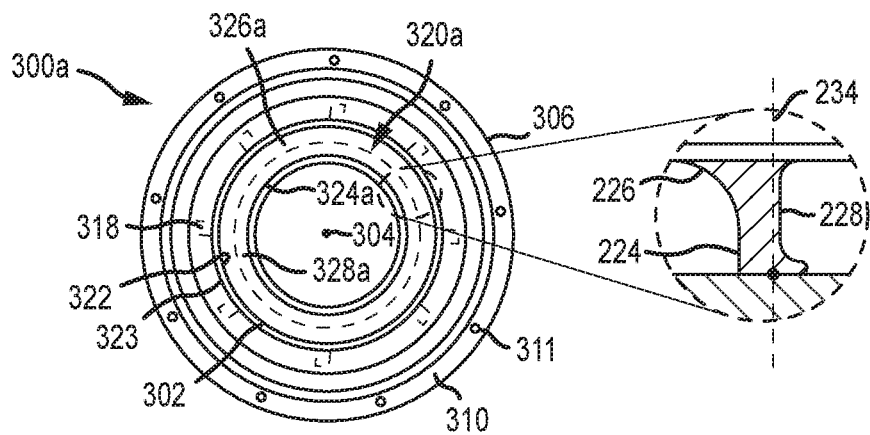
FIGS. 3A, 3B and 3C illustrate axial views of torque plate barrels, in accordance with various embodiments.
Figure 3B:
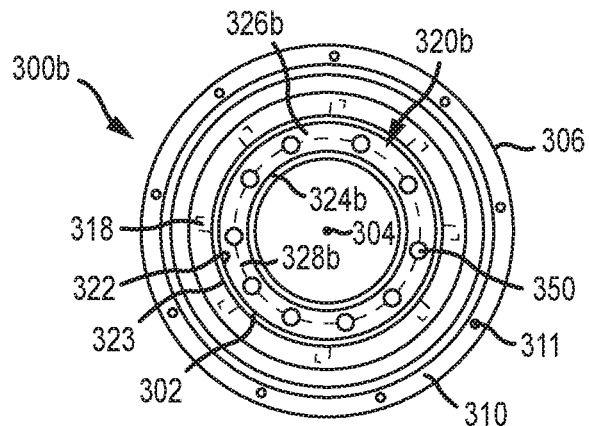
Figure 3C:
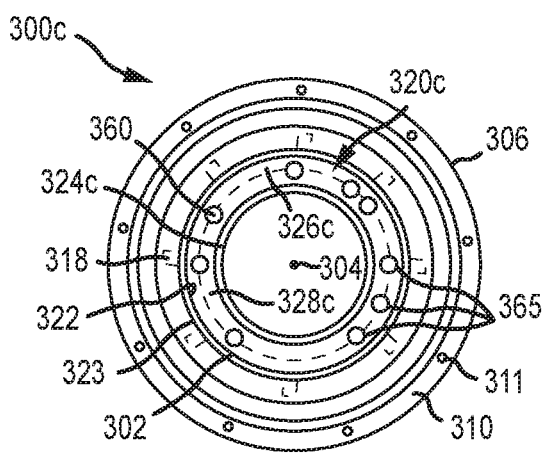

Referring now to FIGS. 3A-3C, several illustrations of torque plate barrels are provided according to various embodiments, viewing from an axially outboard end toward an axially inboard end. Referring to FIG. 3A, a torque plate barrel 300a includes a back leg portion 306 having a first flange 310 with a plurality of apertures 311 extending there through for axially and non-rotatably mounting an end plate of a brake stack to the torque plate barrel 300a, such as the end plate 120 described above with reference to FIG. 1B. The back leg portion 306 slopes radially inward to connect with a torque tube 302 portion of the torque plate barrel 300a. The torque tube 302 includes an inner diameter surface 322 and an outer diameter surface 323. A plurality of splines 318 is disposed on the outer diameter surface 323 of the torque tube 302.

The torque plate barrel 300a further includes a spacer member or pedestal 320a positioned between the inner diameter surface 322 of the torque tube 302 and an outer diameter surface of an axle, such as the axle 102 illustrated in FIG. 1B. The pedestal 320a includes a radially inner portion or foot 324a for engaging the axle, a radially outer portion or head 326a for engaging the inner diameter surface 322 of the torque tube 302 and a web portion 328a radially outward of the foot 324a and radially inward of the head 326a. The pedestal 320a augments support of the torque plate barrel 300a within a brake mechanism generally and, more particularly, against a stationary axle, such as the brake mechanism 100 and axle 102 illustrated in FIG. 1B. The pedestal 320a may be made integral with the torque tube 302 portion of the torque plate barrel 300a. In various embodiments, the geometry of the pedestal 320a, including the foot 324a, the head 326a and the web portion 328a, share the characteristics of the pedestal 220 described above with reference to FIG. 2, as indicated in the blow up portion of FIG. 3A. In various embodiments, the pedestal 320a, including the foot 324a, the head 326a and the web portion 328a, as described above with respect to FIG. 2, is axisymmetric about a central axis 304 extending through the torque plate barrel 300a.

Referring now to FIG. 3B, a torque plate barrel 300b includes many of the same components just described with respect to FIG. 3A. The torque plate barrel 300b includes a back leg portion 306 having a first flange 310 with a plurality of apertures 311 extending there through for axially fixing and non-rotatably mounting an end plate of a brake stack to the torque plate barrel 300b, such as the end plate 120 described above with respect to FIG. 1B. The back leg portion 306 slopes radially inward to connect with a torque tube 302 portion of the torque plate barrel 300b. The torque tube 302 includes an inner diameter surface 322 and an outer diameter surface 323. A plurality of splines 318 is disposed on the outer diameter surface 323 of the torque tube 302.

The torque plate barrel 300b further includes a spacer member or pedestal 320b positioned between the inner diameter surface 322 of the torque tube 302 and an outer diameter surface of an axle, such as the axle 102 illustrated in FIG. 1B. The pedestal 320b includes a radially inner portion or foot 324b for engaging the axle, a radially outer portion or head 326b for engaging the inner diameter surface 322 of the torque tube 302 and a web portion 328b radially outward of the foot 324b and radially inward of the head 326b. In various embodiments, the geometry of the pedestal 320b, including the foot 324b, the head 326b and the web portion 328b, share the characteristics of the pedestal 220 described above with reference to FIG. 2. In various embodiments, the pedestal 320b, including the foot 324b, the head 326b and the web portion 328b, as described above with respect to FIG. 2, is axisymmetric about a central axis 304 extending through the torque plate barrel 300b.

In various embodiments, the pedestal 320b includes a plurality of apertures 350 extending through the pedestal 320b. In various embodiments, the apertures are spaced circumferentially about the pedestal 320b with the spacing between the apertures 350 being substantially equal. In various embodiments, the apertures 350 have diameters sufficiently sized that the apertures extend through the web portion 328b. In various embodiments, the apertures 350 have diameters sufficiently sized that the apertures extend through one or more or all of the foot 324b, the head 326b and the web portion 328b. Any number of apertures 350 equally spaced about the pedestal 320b may be included and the number of apertures 350 may be odd or even.

Referring now to FIG. 3C, a torque plate barrel 300c includes many of the same components just described with respect to FIGS. 3A and 3B. The torque plate barrel 300c includes a back leg portion 306 having a first flange 310 with a plurality of apertures 311 extending there through for axially and non-rotatably mounting an end plate of a brake stack to the torque plate barrel 300c, such as the end plate 120 described above with respect to FIG. 1B. The back leg portion 306 slopes radially inward to connect with a torque tube 302 portion of the torque plate barrel 300c. The torque tube 302 includes an inner diameter surface 322 and an outer diameter surface 323. A plurality of splines 318 is disposed on the outer diameter surface 323 of the torque tube 302.

The torque plate barrel 300c further includes a spacer member or pedestal 320c positioned between the inner diameter surface 322 of the torque tube 302 and an outer diameter surface of an axle, such as the axle 102 illustrated in FIG. 1B. The pedestal 320c includes a radially inner portion or foot 324c for engaging the axle, a radially outer portion or head 326c for engaging the inner diameter surface 322 of the torque tube 302 and a web portion 328c radially outward of the foot 324c and radially inward of the head 326c. In various embodiments, the geometry of the pedestal 320c, including the foot 324c, the head 326c and the web portion 328c, share the characteristics of the pedestal 220 described above with reference to FIG. 2. In various embodiments, the pedestal 320c, including the foot 324c, the head 326c and the web portion 328c, as described above with respect to FIG. 2, is axisymmetric about a central axis 304 extending through the torque plate barrel 300c.

In various embodiments, the pedestal 320c includes a plurality of apertures 360 extending through the pedestal 320c. In various embodiments, the apertures are spaced circumferentially about the pedestal 320c with the spacing between the apertures 360 being substantially unequal. In various embodiments, the apertures 360 have diameters sufficiently sized that the apertures extend through the web portion 328c. In various embodiments, the apertures 360 have diameters sufficiently sized that the apertures extend through one or more or all of the foot 324c, the head 326c and the web portion 328c. Any number of apertures 360 unequally spaced about the pedestal 320c may be included and the number of apertures 360 may be odd or even. In various embodiments, one or more subsets 365 of the apertures 360 may be spaced evenly about a portion of the pedestal 320c, but the sum of all apertures 360 is unevenly spaced circumferentially about the pedestal 320c.

Figure 4A:
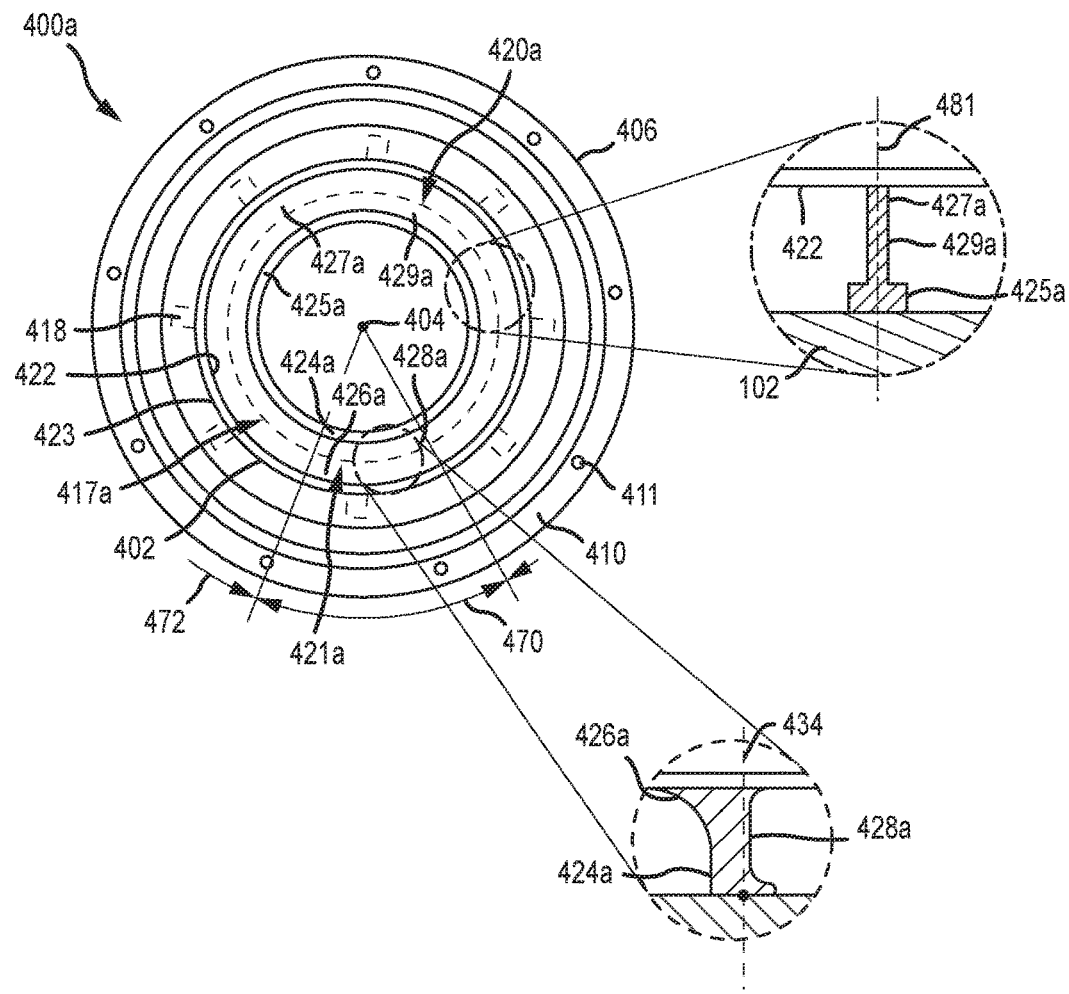
FIGS. 4A, 4B and 4C illustrate axial views of torque plate barrels, in accordance with various embodiments.
Figure 4B:
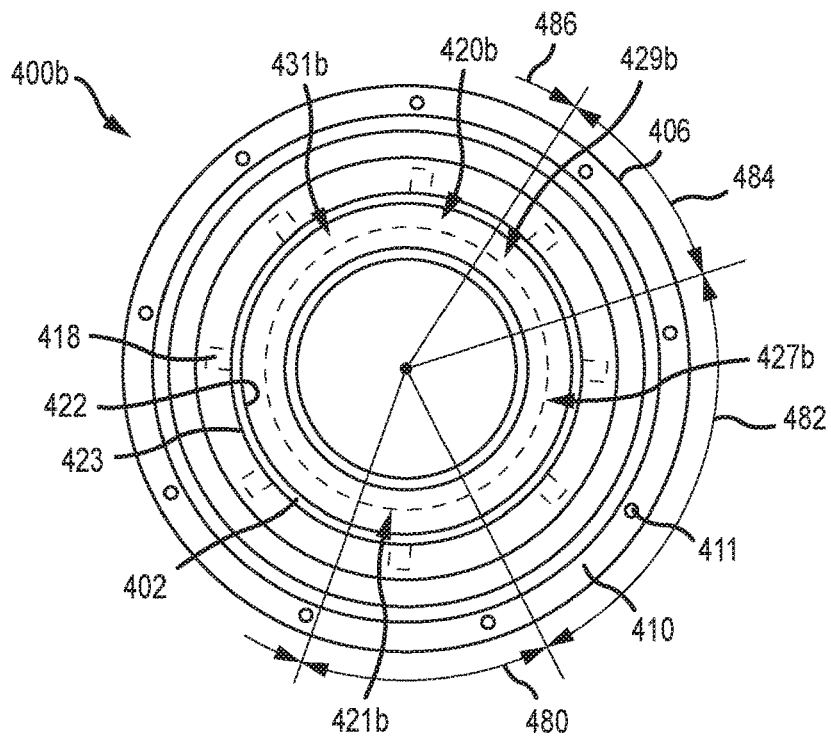
Figure 4C:
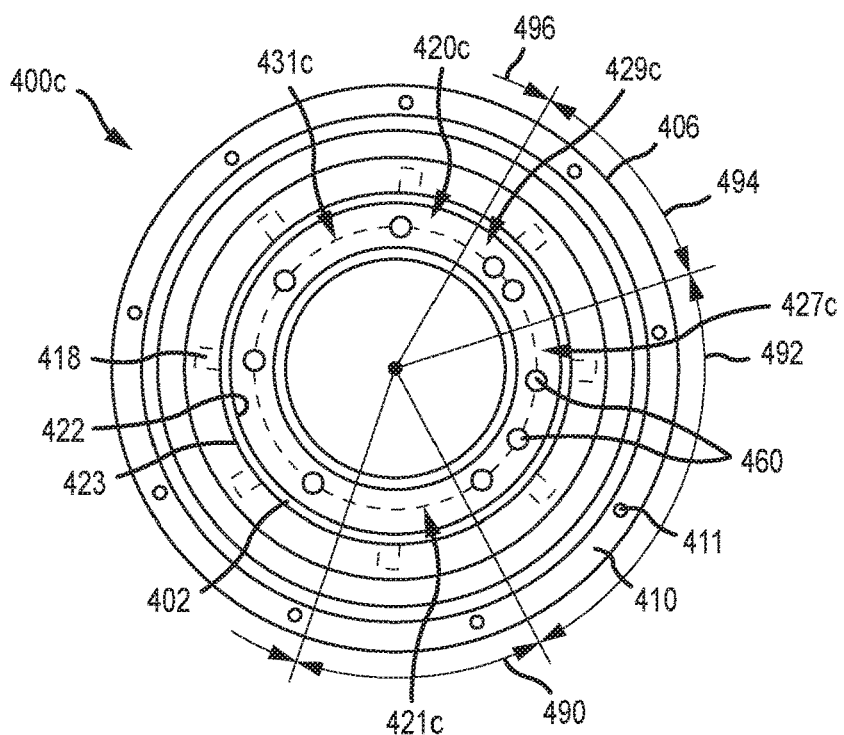

Referring now to FIGS. 4A-4C, several illustrations of torque plate barrels are provided according to various embodiments, viewing from an axially outboard end toward an axially inboard end. Referring to FIG. 4A, a torque plate barrel 400a includes a back leg portion 406 having a first flange 410 with a plurality of apertures 411 extending there through for axially and non-rotatably mounting an end plate of a brake stack to the torque plate barrel 400a, such as the end plate 120 described above with respect to FIG. 1B. The back leg portion 406 slopes radially inward to connect with a torque tube 402 portion of the torque plate barrel 400a. The torque tube 402 includes an inner diameter surface 422 and an outer diameter surface 423. A plurality of splines 418 is disposed on the outer diameter surface 423 of the torque tube 402.

The torque plate barrel 400a further includes a spacer member or pedestal 420a positioned between the inner diameter surface 422 of the torque tube 402 and an outer diameter surface of an axle, such as the axle 102 illustrated in FIG. 1B. The pedestal 420a includes a first pedestal portion 421a within a first angular segment 470 having a radially inner portion or foot 424a for engaging the axle, a radially outer portion or head 426a for engaging the inner diameter surface 422 of the torque tube 402 and a web portion 428a radially outward of the foot 424a and radially inward of the head 426a. In various embodiments, the pedestal 420a includes a second pedestal portion 417a within a second angular segment 472 that encompasses the portion of the pedestal 420a not included in the first angular segment 470. The second pedestal portion 417a within the second angular segment 472 may likewise include a radially inner portion or foot 425a for engaging the axle, a radially outer portion or head 427a for engaging the inner diameter surface 422 of the torque tube 402 and a web portion 429a radially outward of the foot 425a and radially inward of the head 427a. However, in various embodiments, as illustrated by the insets in FIG. 4A, the cross sectional geometry of the first pedestal portion 421a within the first angular segment 470 is not the same as the cross sectional geometry of the second pedestal portion 417a within the second angular segment 472.

In various embodiments, the geometry of the first pedestal portion 421a within the first angular segment 470, including the foot 424a, the head 426a and the web portion 428a, share the characteristics of the pedestal 220 described above with reference to FIG. 2, including being non-symmetric about a first radial plane 434. In various embodiments, the geometry of the second pedestal portion 417a within the second angular segment 472, as illustrated by the insets in FIG. 4A, includes a different cross sectional geometry than that included in the first angular segment 470. In various embodiments, as illustrated by the insets, the second pedestal portion 417a is symmetric about a second radial plane 481. In various embodiments, the head 427a and the web portion 429a of the second pedestal portion 417a include radially straight side walls, and the intersections of the sidewalls of the head 427a with the inner diameter surface 422 of the torque tube 402 approach ninety degree angles, rather than defined radii of curvature as described above and with reference to FIG. 2.

Referring now to FIG. 4B, a torque plate barrel 400b includes a back leg portion 406 having a first flange 410 with a plurality of apertures 411 extending there through for axially and non-rotatably mounting an end plate of a brake stack to the torque plate barrel 400b, such as the end plate 120 described above with reference to FIG. 1B. The back leg portion 406 slopes radially inward to connect with a torque tube 402 portion of the torque plate barrel 400b. The torque tube 402 includes an inner diameter surface 422 and an outer diameter surface 423. A plurality of splines 418 is disposed on the outer diameter surface 423 of the torque tube 402.

Similar to the embodiment described above with respect to FIG. 4A, various embodiments of the torque plate barrel 400b, as depicted in FIG. 4B, include angular segments having variations in the cross sectional geometry of a pedestal 420b. In various embodiments, the pedestal 420b includes a first pedestal portion 421b within a first angular segment 480 having a first cross sectional geometry, a second pedestal portion 427b within a second angular segment 482 having a second cross sectional geometry, a third pedestal portion 429b within a third angular segment 484 having a third cross sectional geometry and a fourth pedestal portion 431b within a fourth angular segment 486 having a fourth cross sectional geometry of the pedestal. Fewer or greater numbers of angular segments may be included having angular values greater or lesser than the values illustrated in FIG. 4B. In various embodiments, the first pedestal portion 421b within the first angular segment 480 and the third pedestal portion 429b within the third angular segment 484 have cross sectional geometries similar to those described above with reference to FIG. 2. In various embodiments, the second pedestal portion 427b within the second angular segment 482 and the fourth pedestal portion 431b within the fourth angular segment 486 have cross sectional geometries similar to that described above with reference the second pedestal portion 417a within the second angular segment 472, as illustrated in FIG. 4A.

In various embodiments, each of the first 421b, second 427b, third 429b and fourth 431b pedestal portions have a cross sectional geometry similar to that described above with reference to FIG. 2, except the pedestal portion within each respective first 480, second 482, third 484 and fourth 486 angular segment has different values for the first and second radii of curvature. In various embodiments, one or more of the first and second radii of curvature, as discussed above with reference to FIG. 2, may vary in value from one end of a segment to the other, such that a smooth transition occurs in the cross sectional geometry of the pedestal 420b from one angular segment to the next.

Referring now to FIG. 4C, a torque plate barrel 400c includes a back leg portion 406 having a first flange 410 with a plurality of apertures 411 extending there through for axially and non-rotatably mounting an end plate of a brake stack to the torque plate barrel 400c, such as the end plate 120 described above with reference to FIG. 1B. The back leg portion 406 slopes radially inward to connect with a torque tube 402 portion of the torque plate barrel 400c. The torque tube 402 includes an inner diameter surface 422 and an outer diameter surface 423. A plurality of splines 418 is disposed on the outer surface 423 of the torque tube 402.

Similar to the embodiments described above with respect to FIGS. 4A and 4B, various embodiments of the torque plate barrel 400c, as depicted in FIG. 4C, include angular segments having variations in the cross sectional geometry of a pedestal 420c. In various embodiments, the pedestal 420c includes a first pedestal portion 421c within a first angular segment 490 having a first cross sectional geometry, a second pedestal portion 427c within a second angular segment 492 having a second cross sectional geometry, a third pedestal portion 429c within a third angular segment 494 having a third cross sectional geometry and a fourth pedestal portion 431c within a fourth angular segment 496 having a fourth cross sectional geometry of the pedestal. Fewer or greater numbers of angular segments may be included having angular values greater or lesser than the values illustrated in FIG. 4C. In various embodiments, the first 490, second 492, third 494 and fourth 496 angular segments each include a respective pedestal portion having characteristics and a cross sectional geometry similar to that described above with reference to FIG. 4B. Similar to the embodiments discussed above with reference to FIGS. 3B and 3C, in various embodiments, the torque plate barrel 400c includes one or more apertures 460 extending through the pedestal 420c. In various embodiments, the apertures 460 are spaced circumferentially about the pedestal 420c with the spacing between the apertures 460 being substantially equal or unequal. Any number of apertures 460 equally or unequally spaced about the pedestal 420c may be included and the number of apertures 460 may be odd or even. In various embodiments, the diameter of the apertures 460 may vary among the plurality of apertures.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A torque plate barrel for a braking system, comprising:
a torque tube having a first end and a second end spaced from the first end along a central axis, the torque tube having an inner surface; and
a pedestal having a foot portion configured to engage an axle and a head portion configured to engage the inner surface of the torque tube,
wherein the head portion of the pedestal includes a first radius of curvature defining a first surface facing toward the first end of the torque tube and a second radius of curvature defining a second surface facing toward the second end of the torque tube,
wherein the first radius of curvature is at least about two times greater than the second radius of curvature and
wherein the foot portion of the pedestal includes a third radius of curvature defining a third surface facing toward the second end of the torque tube, the third radius of curvature having a value about equal to the second radius of curvature.

2. The torque plate barrel of claim 1, wherein the first radius of curvature is at least about five times greater than the second radius of curvature.

3. The torque plate barrel of claim 1, wherein the pedestal further includes a web portion extending radially between the head portion and the foot portion.

4. The torque plate barrel of claim 3, wherein the web portion includes a first radial surface facing toward the first end and a second radial surface facing toward the second end.

5. The torque plate barrel of claim 4, wherein the first surface defined by the first radius of curvature has a radially outer portion that intersects the inner surface of the torque tube and a radially inner portion that intersects a portion of the first radial surface.

6. The torque plate barrel of claim 1, wherein the foot portion includes a circumferential surface configured to engage an outer surface of the axle and wherein a radial plane extending through an axial midpoint of the circumferential surface defines a first portion of the pedestal facing toward the first end of the torque tube and a second portion of the pedestal facing toward the second end of the torque tube and wherein a first cross sectional area defined by the first portion of the pedestal is greater in value than a second cross sectional area defined by the second portion of the pedestal.

7. The torque plate barrel of claim 6, wherein the first cross sectional area encompasses an area of the pedestal on the side of the radial plane facing the first end of the torque tube to a first point where the first radius of curvature intersects with the inner surface of the torque tube and wherein the second cross sectional area encompasses an area of the pedestal on the side of the radial plane facing the second end of the torque tube to a second point where the second radius of curvature intersects with the inner surface of the torque tube.

8. The torque plate barrel of claim 7, wherein the first cross sectional area is at least about twice as great as the second cross sectional area.

9. The torque plate barrel of claim 1, wherein the pedestal comprises a first pedestal portion having a first pedestal cross section extending circumferentially about the central axis a first angular segment and a second pedestal portion having a second pedestal cross section extending circumferentially about the central axis a second angular segment and wherein the first pedestal cross section has a shape different from the second pedestal cross section.

10. The torque plate barrel of claim 9, wherein the pedestal further comprises a third pedestal portion having a third pedestal cross section extending circumferentially about the central axis a third angular segment and wherein the third pedestal cross section has a shape different from the first pedestal cross section and the second pedestal cross section.

11. The torque plate barrel of claim 10, wherein the pedestal further comprises one or more apertures extending therethrough.

12. A torque plate barrel for a braking system, comprising:
a torque tube having a first end and a second end spaced from the first end along a central axis, the torque tube having an inner surface; and
a pedestal disposed intermediate the first end and the second end, the pedestal having a first circumferential surface configured to engage an outer surface of an axle and having an axial midpoint, a second circumferential surface configured to engage the inner surface of the torque tube, a first surface facing toward the first end of the torque tube and a second surface facing toward the second end of the torque tube,
wherein a radial plane extending through the axial midpoint of the first circumferential surface defines a first cross sectional area encompassing an area of the pedestal on the side of the radial plane facing the first end of the torque tube to a first point where the first surface intersects the inner surface of the torque tube and a second cross sectional area encompassing an area of the pedestal on the side of the radial plane facing the second end of the torque tube to a second point where the second surface intersects the inner surface of the torque tube,
wherein the first cross sectional area is greater than the second cross sectional area,
wherein a head portion of the pedestal includes a first radius of curvature defining a first surface facing toward the first end of the torque tube and a second radius of curvature defining a second surface facing toward the second end of the torque tube, the first radius of curvature being at least about two times greater than the second radius of curvature and
wherein a foot portion of the pedestal includes a third radius of curvature defining a third surface facing toward the second end of the torque tube, the third radius of curvature having a value about equal to the second radius of curvature.

13. The torque plate barrel of claim 12, wherein the first cross sectional area is at least about twice as great as the second cross sectional area.

14. The torque plate barrel of claim 13, wherein the pedestal comprises one or more apertures extending therethrough.

15. The torque plate barrel of claim 14, wherein the pedestal comprises a first pedestal portion having a first pedestal cross section extending circumferentially about the central axis a first angular segment and a second pedestal portion having a second pedestal cross section extending circumferentially about the central axis a second angular segment and wherein the first pedestal cross section has a shape different from the second pedestal cross section.

16. The torque plate barrel of claim 14, wherein the one or more apertures are spaced unevenly about the pedestal.

17. A torque plate barrel for a braking system, comprising:
a torque tube having a first end and a second end spaced from the first end along a central axis, the torque tube having an inner surface; and
a pedestal, comprising
a foot portion having a circumferential surface configured for engagement with an axle, the circumferential surface having an axial midpoint,
a head portion connected to the inner surface of the torque tube and
a web portion radially disposed between the head portion and the foot portion,
wherein the head portion includes a first radius of curvature defining a first surface facing toward the first end of the torque tube and a second radius of curvature defining a second surface facing toward the second end of the torque tube, the first radius of curvature being at least about two times greater than the second radius of curvature,
wherein a foot portion of the pedestal includes a third radius of curvature defining a third surface facing toward the second end of the torque tube, the third radius of curvature having a value about equal to the second radius of curvature and
wherein a radial plane extending through the axial midpoint of the circumferential surface defines a first cross sectional area encompassing an area of the pedestal on the side of the radial plane facing the first end of the torque tube to a first point where the first surface intersects the inner surface of the torque tube and a second cross sectional area encompassing an area of the pedestal on the side of the radial plane facing the second end of the torque tube to a second point where the second surface intersects the inner surface of the torque tube, the first cross sectional area being greater than the second cross sectional area.

18. The torque plate barrel of claim 17, wherein the pedestal further comprises a first pedestal portion having a first pedestal cross section extending circumferentially about the central axis a first angular segment and a second pedestal portion having a second pedestal cross section extending circumferentially about the central axis a second angular segment and wherein the first pedestal cross section has a shape different from the second pedestal cross section.

* * * * *